United States Patent [19]
Warren

[11] Patent Number: 4,485,395
[45] Date of Patent: Nov. 27, 1984

[54] MISREGISTRATION PREVENTION IN TWO CHANNEL VTRS

[75] Inventor: Henry R. Warren, Belle Mead, N.J.

[73] Assignee: RCA Corporation, New York, N.Y.

[21] Appl. No.: 420,831

[22] Filed: Sep. 21, 1982

[51] Int. Cl.³ .............................................. H04N 5/93
[52] U.S. Cl. ..................... 358/17; 358/320; 358/323; 360/26
[58] Field of Search ................... 358/17, 35, 905, 311, 358/320, 321, 323, 325, 326, 327, 328; 360/26, 77

[56] References Cited
U.S. PATENT DOCUMENTS

| | | | |
|---|---|---|---|
| 3,100,816 | 8/1963 | Coleman | 358/326 |
| 3,483,540 | 12/1969 | Damron | 360/26 |
| 4,393,397 | 7/1983 | Holmes | 358/905 |
| 4,399,472 | 8/1983 | Yamamoto et al. | 358/320 |
| 4,403,244 | 9/1983 | Fujishima | 358/325 |

*Primary Examiner*—Michael A. Masinick
*Attorney, Agent, or Firm*—E. M. Whitacre; W. H. Meise; H. I. Steckler

[57] ABSTRACT

A tape has Y and C components of a television signal recorded in different tracks. This can lead to mistiming and hence misregistration errors. To correct this a phase error signal is generated from the horizontal sync signals in each track and used to control variable delay lines for the Y and C to correct the misregistration. Separate delay lines for the I and Q components can also be used.

6 Claims, 5 Drawing Figures

MISREGISTRATION PREVENTION IN TWO CHANNEL VTRS

BACKGROUND OF THE INVENTION

The present invention relates to preventing misregistration between luminance (Y) and chroma (C) component signals of color television signals, and more particularly, to such prevention when said components are transmitted in separate channels, such as two tracks of a VTR (video tape recorder).

One method of recording color television signals is to use separate tracks for the Y and C signal components in order to eliminate cross-modulation between components and allow a wider bandwidth. In particular, recording wherein adjacent tracks comprise information recorded at a non-parallel angle with respect to one another ("azimuth recording") is used in order to eliminate guardbands, and hence increase recording time with respect to parallel gap recording for a given amount of tape. However, a slight displacement between the Y and C playback heads usually occur, which result in a timing error between the Y and C signals. Thus there will be a displacement of the Y and C signals on the display device, i.e. misregistrations.

It is therefore desirable to prevent misregistration of a color television image displayed from component signals transmitted in separate channels.

SUMMARY OF THE INVENTION

Method and apparatus for synchronizing two components of a television signal transmitted over separate channels, each of said components having a reference signal, comprising separating said reference signal contained within each of said components, phase comparing the separated signals to produce an error voltage, and delaying at least one component in accordance with said error voltage.

DETAILED DESCRIPTION

Figure 1:
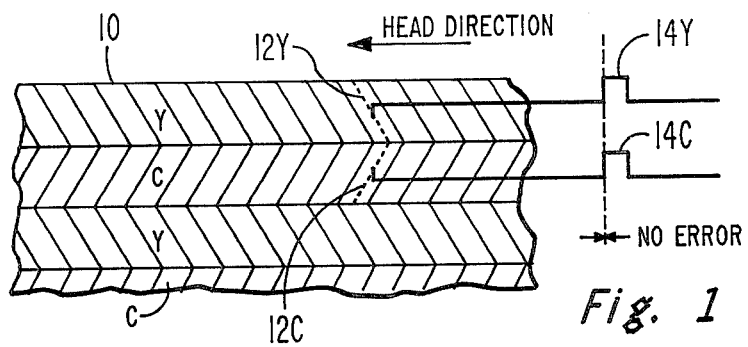
FIGS. 1 and 2 show segments of a prerecorded tape with and without timing errors respectively.
Figure 2:
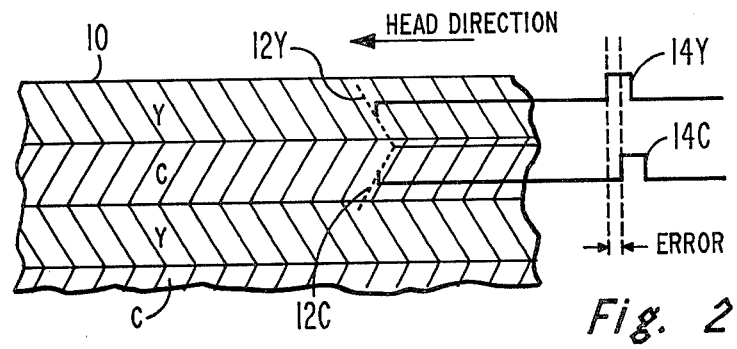

FIG. 1 shows a precorded tape having azimuth FM recorded alternating Y and C tracks also comprising horizontal synchronization (sync) pulses. As known in the art, control timing, and audio signals are recorded along an edge of the tape (not shown). Dotted lines 12Y and 12C show the gap position of the heads on tape 10 when there is no mistracking. As will be seen in the timing diagram in the right portion of FIG. 1, the reproduced horizontal sync pulses 14Y and 14C are coincident. Thus there will be no misregistration error due to the mistracking upon display of the Y and C signals. FIG. 2 shows the head gap positions 12Y and 12C when there is mistracking. As will be seen in the timing diagram, an error occurs between sync pulses 14Y and 14C, and therefore for the rest of the horizontal line.

Figure 3:
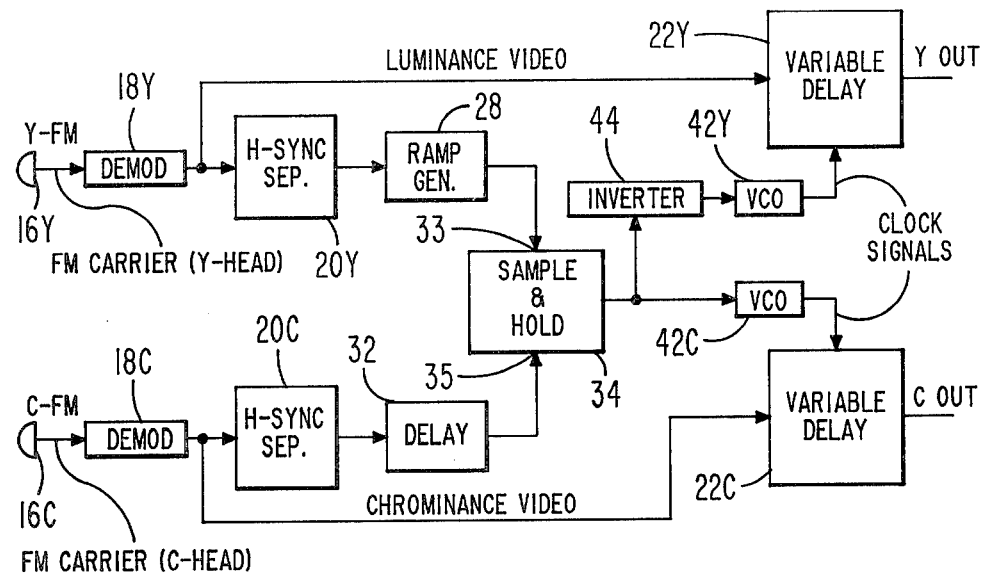
FIG. 3 shows a block diagram of a first embodiment of the invention.

FIG. 3 shows a block diagram of the invention. The Y and C signals are reproduced by heads 16Y and 16C respectively, which heads are mounted on a rotating headwheel (not shown) and engage tape 10 to helically scan tape 10, all as known in the art. The reproduced Y and C signals are respectively applied to FM demodulators 18Y and 18C. The demodulated Y and C output signals are applied to horizontal sync separators 20Y and 20C respectively and also to the inputs of variable delay lines 22Y and 22C respectively.

Figure 5:
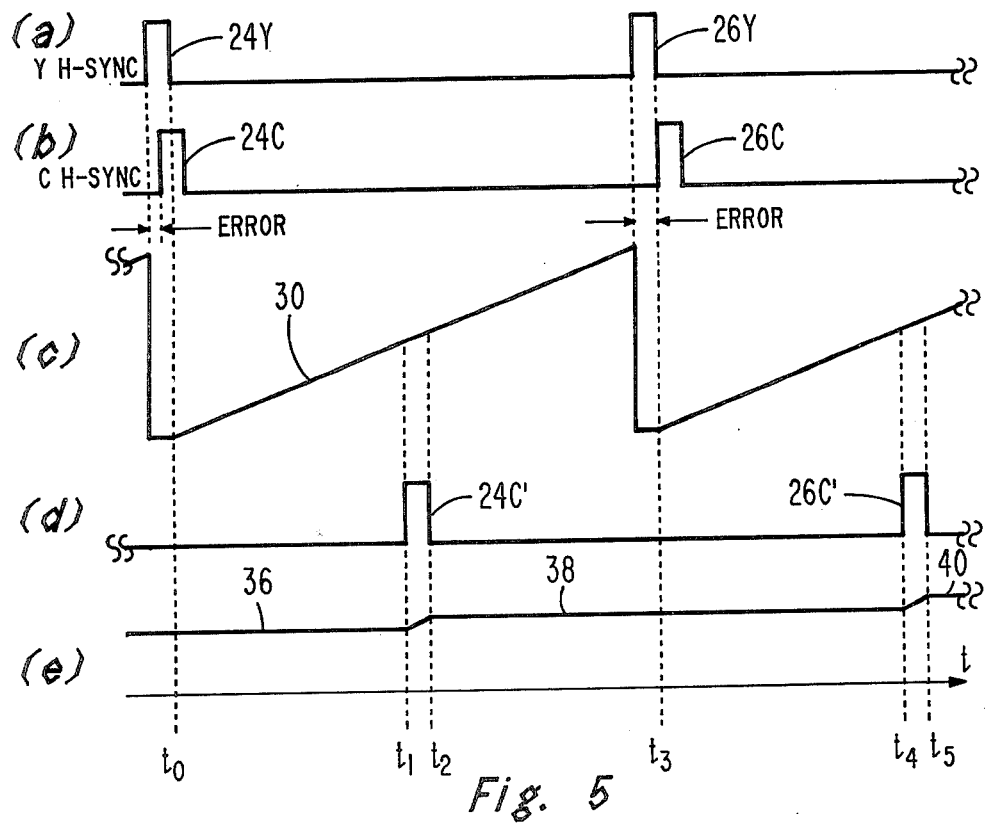
FIG. 5 is a timing diagram explaining FIGS. 3 and 4.

The separated sync signals of the Y and C signals are shown in FIGS. 5a and 5b respectively, wherein the error between sync pulses 24Y and 24C is one-half a pulse width, while the error between pulses 26Y and 26C is a whole pulse width. The pulses 24Y and 26Y are applied to ramp generator 28 having an output waveform 30 shown in FIG. 5c. It is noted that the trailing edges of pulses 24Y and 26Y start ramp generator 28, while the leading edges thereof reset generator 28. The output signal from generator 28 is applied to signal input 33 of sample-and-hold circuit 34. The separated sync of the C signal is applied to delay line 32, which has a delay of one-half a line period. The output signal of delay 32 is shown in FIG. 5d (wherein primed numbers represent the correspondingly numbered pulses of FIG. 5b with said delay) and is applied to the sampling control input 35 of sample-and-hold circuit 34. It will be appreciated that the one-half line delay of delay line 32 allows bidirectional sampling as the C-sync pulses lead or lag the Y-sync pulses.

The output signal of circuit 34 is shown in FIG. 5e and is at some initial level 36, which level represents no error between the C and Y sync pulses. During the next succeeding line, pulse 24C' then samples waveform 30 during interval $t_1-t_2$ and the output voltage rises to level 38, which level represents the one-half sync pulse error. Thereafter, pulse 26C' samples waveform 30 during interval $t_4-t_5$. Since interval $t_4-t_5$ occurs later with respect to the start of the ramp at $t_3$ than does interval $t_1-t_2$ with respect to the start of the ramp at $t_0$, level 40 is higher than level 38. If the reverse situation from that shown in FIGS. 5a and 5b occurs, i.e. the C-signal H-sync is leading the Y-signal H-sync, then output voltage levels less than level 36 occur. Thus the output voltage from circuit 34 comprises an error voltage representing the phase difference between the Y and C H-sync pulses.

The output voltage from circuit 34 is directly applied to a frequency control input of VCO (voltage controlled oscillator) 42C and through inverter 44 to a frequency control input of VCO 24Y. Thus the frequency of VCO 42Y is decreased from a nominal value, while that of VCO 42C is increased. The output signal from VCOs 42Y and 42C are applied as clock signals to variable delay lines 22Y and 22C respectively. The higher frequency signal applied to delay line 22Y compared with that applied to delay line 22C causes delay line 22Y to have a lower delay time as compared with that of delay line 22C. Thus the Y and C output signals from lines 22Y and 22C will be in time coincidence and no misregistration problems due to the VTR will occur upon display.

If the C-signal leads the Y-signal, then the frequency of VCO 24C will be higher than that of VCO 42Y, and hence delay line 22Y will delay by a greater amount than delay line 22C, thereby restoring registration. If the C-signal coincides with the Y-signal, then VCOs 42Y and 42C will provide the same clock frequency to lines 22Y and 22C, which lines will now have the same delay, thereby preserving the timing.

Figure 4:
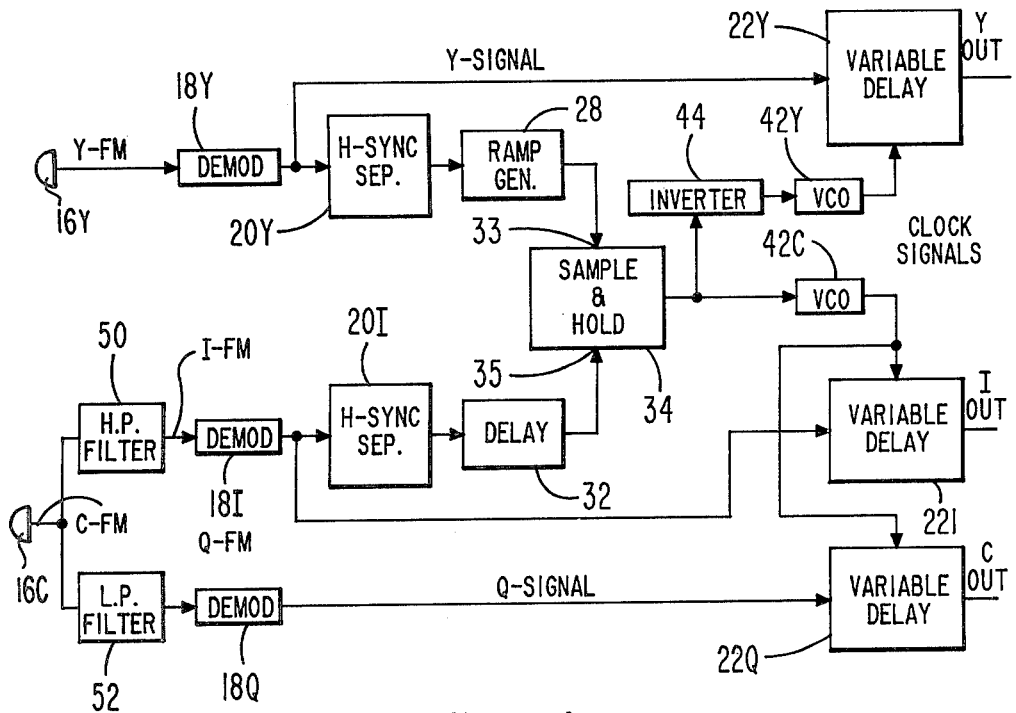
FIG. 4 shows a block diagram of a second embodiment of the invention.

FIG. 4 shows a second embodiment of the invention wherein corresponding elements have been given corresponding reference numbers. In this embodiment, the C signal is divided into I and Q signals by high and low pass filters 50 and 52 respectively. A phase comparison is then carried out exactly as explained above between the Y and I signals. The I-signal rather than the Q-signal is used for the phase comparison since it has a wider bandwidth, and therefore the sync pulse edges are more clearly defined. Separate variable delay lines 22I and 22Q are required for the I and Q signals respectively, both being controlled by oscillator 42C.

It will be noted that since the time delays of variable delay lines 22Y and 22C in FIG. 3 are shifted in opposite directions, the average horizontal frequency remains a constant. Therefore horizontal time displacement is avoided. The same advantage occurs with respect to the embodiment of FIG. 4.

It will be appreciated that a special signal could be inserted into each of the channels and used as a reference signal that is phase detected instead of the horizontal sync signals.

What is claimed is:

1. Apparatus for synchronizing luminance and chrominance components of a television signal transmitted over separate channels, each of said components comprising a reference signal, said apparatus comprising:

separating means for separating said reference signal contained within each of said luminance and chrominance components;

comparing means coupled to said separating means for phase comparing the separated reference signals to produce a phase error voltage, said comparing means comprising a ramp generator having an input terminal coupled to said separating means for receiving separated reference signal therefrom for resetting said ramp in response to one of said separated luminance reference signal and said separated chrominance reference signal, said comparing means further comprising a delay line having an input coupled to said separating means for receiving the other of said separated luminance reference signal and said separated chrominance reference signal for generating a delayed reference signal, said comparing means further comprising a sample-and-hold circuit having inputs coupled to said ramp generator and to said delay line for sampling said ramp at the time of said delayed reference signal and for holding the sampled value for providing a phase error voltage; and delaying means coupled to receive said at least one of said luminance and chrominance components and coupled to said comparing means for synchronizing said luminance and chrominance components in response to said phase error voltage.

2. Apparatus as claimed in claim 1, wherein said delay line has a delay of one-half a horizontal line time.

3. Apparatus as claimed in claim 1, wherein said delay line receives only the I-signal separated reference signal of the chrominance signal.

4. Apparatus as claimed in claim 1, wherein said delaying means comprises first and second voltage controlled oscillators each having a frequency control input, said first oscillator input receiving said phase error voltage, an inverter having an input receiving said phase error voltage and an output coupled to said second oscillator control input, first and second variable delay lines having signal inputs coupled to receive said chrominance and luminance signals respectively, and control inputs coupled to said first and second oscillators respectively.

5. Apparatus as claimed in claim 4, wherein said first delay line receives an I-signal component of said chrominance signal, and further comprising a third variable delay line having a signal input receiving a Q-signal component of said chrominance signal, and a control signal input coupled to said first oscillator.

6. Apparatus as claimed in claim 1, wherein said separated reference signals comprise horizontal synchronization signals.

* * * * *